United States Patent
Aoki

(10) Patent No.: US 8,746,304 B2
(45) Date of Patent: Jun. 10, 2014

(54) PNEUMATIC TIRE

(75) Inventor: Tomonori Aoki, Tokorozawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 12/746,883

(22) PCT Filed: Nov. 25, 2008

(86) PCT No.: PCT/JP2008/071295
§ 371 (c)(1),
(2), (4) Date: Jul. 22, 2010

(87) PCT Pub. No.: WO2009/075182
PCT Pub. Date: Jun. 18, 2009

(65) Prior Publication Data
US 2011/0005649 A1    Jan. 13, 2011

(30) Foreign Application Priority Data
Dec. 10, 2007  (JP) ................................ 2007-318185

(51) Int. Cl.
*B60C 11/03* (2006.01)

(52) U.S. Cl.
USPC ............ 152/209.18; 152/209.12; 152/209.13; 152/209.27

(58) Field of Classification Search
USPC ............. 152/209.12, 209.13, 209.18, 209.17, 152/209.27
See application file for complete search history.

(56) References Cited

U.S. PATENT DOCUMENTS

| | | | | |
|---|---|---|---|---|
| 3,841,372 A | * | 10/1974 | Boileau | 152/209.1 |
| RE30,527 E | * | 2/1981 | Verdier | 152/209.27 |
| 4,884,606 A | * | 12/1989 | Matsuda et al. | 152/209.18 |
| 6,761,196 B2 | * | 7/2004 | Takubo | 152/209.17 |
| 7,168,469 B2 | * | 1/2007 | Kobayashi et al. | 152/527 |
| 2002/0053383 A1 | * | 5/2002 | Kleinhoff et al. | 152/209.18 |
| 2008/0289738 A1 | * | 11/2008 | Nakamura et al. | 152/209.24 |

FOREIGN PATENT DOCUMENTS

| | | |
|---|---|---|
| EP | 0 116 997 A2 | 8/1984 |
| FR | 2 634 424 A1 | 1/1990 |
| GB | 2221877 * | 2/1990 |
| JP | 62-261508 A1 | 11/1987 |
| JP | 63-297108 A | 12/1988 |
| JP | 07-081323 * | 3/1995 |
| JP | 07-164823 A | 6/1995 |
| JP | 10-250314 A | 9/1998 |

(Continued)

OTHER PUBLICATIONS

English machine translation of JP2001-315507, dated Nov. 2001.*

(Continued)

*Primary Examiner* — Steven D Maki
*Assistant Examiner* — Robert Dye
(74) *Attorney, Agent, or Firm* — Sughrue Mion, PLLC

(57) ABSTRACT

A pneumatic tire has two circumferential-direction main grooves (13) and lug grooves (15). The circumferential-direction main grooves are disposed outside quarter point sections of a tread contact width (TW) in a tread width direction, respectively, the two circumferential-direction main grooves extending in a tire circumferential direction, each of the quarter point sections of the tread contact width (TW) being a midpoint between a tire equator line and a corresponding tread end portion. The lug grooves are extended outwardly from the circumferential-direction main grooves in the tread width direction. Each quarter point section of the tread contact width (TW) has a rib-like shape continuously extending in the tire circumferential direction.

5 Claims, 4 Drawing Sheets

(56) References Cited

FOREIGN PATENT DOCUMENTS

| | | | | |
|---|---|---|---|---|
| JP | 11-034615 | * | 2/1999 | |
| JP | 11-245622 A | | 9/1999 | |
| JP | 11-321236 A | | 11/1999 | |
| JP | 2001315507 | * | 11/2001 | ............ B60C 11/117 |
| JP | 2005-297909 A1 | | 10/2005 | |
| JP | 2007-112306 A | | 5/2007 | |
| WO | 2006/013758 A1 | | 2/2006 | |
| WO | 2007/018009 A1 | | 2/2007 | |
| WO | 2008/056504 A1 | | 5/2008 | |

OTHER PUBLICATIONS

Extended European Search Report issued in European Application No. 08860259.4 dated Jan. 7, 2014.

* cited by examiner

PNEUMATIC TIRE

CROSS REFERENCE TO RELATED APPLICATIONS

This application is a National Stage of International Application No. PCT/JP2008/071295 filed Nov. 25, 2008, claiming priority based on Japanese Patent Application No. 2007-318185 filed Dec. 10, 2007, the contents of all of which are incorporated herein by reference in their entirety.

TECHNICAL FIELD

The present invention relates to a pneumatic tire, and particularly to a pneumatic tire capable of providing a greatly extended tire lifetime through great improvement in wear resistance.

BACKGROUND ART

In the case of a pneumatic tire, called a heavy duty tire, to be mounted on a heavy duty vehicle such as a construction vehicle, conventionally, a tread gauge, which is a thickness of a tread portion, has been increased, or a negative ratio (an area ratio of groove portions to a tread surface) of a tread pattern has been decreased, for the purpose of extending the lifetime before complete wear of a pneumatic tire.

However, the pneumatic tire called a heavy duty tire has a characteristic that a crossing width over which multiple belt layers intersect with one another is narrower than a tread contact width over which a tread surface is brought into contact with the ground. Hence, immediately before the tread surface is brought into contact with the ground, bending deformation may occur. This results in a rapid progress of wear of quarter point sections of a tread contact width (midpoints each located between a tire equator line and corresponding one of tread end contact portions on both sides).

To tackle this, a pneumatic tire has been disclosed, for which an inclination angle of belt cords constituting a belt layer to a tire equator line and the above-described crossing width are specified with respect to the quarter point sections of the tread contact width (Japanese Patent Application Publication No. 2005-297909).

In the case of the above-described conventional pneumatic tire, the wear resistance of the quarter point sections of the tread contact width is improved, and accordingly the tire lifetime is extended. However, under the current situation, further improvement in wear resistance has been demanded.

The present invention has been made in view of such circumstances, and an object of the present invention is to provide a pneumatic tire capable of providing a greatly extended tire lifetime through great improvement in wear resistance of the quarter point sections of the tread contact width.

DISCLOSURE OF THE INVENTION

In order to devise the present invention, the inventor has made an earnest study on the wear of a tread and the deformation of a center land portion. As a result, the following are found out. Specifically, an amount of wear is larger around midpoints each located between a tire equator line and corresponding one of tread contact end portions on both sides, i.e., the quarter point sections of the tread contact width. The uneven wear in the quarter point sections, where the amount of wear is the largest, is mainly due to slippage occurring between a tread surface and a road surface in a direction perpendicular to the tire equator line and outward of the tire. The uneven wear of a tread portion is significant around so-called end portions of a belt layer in a width direction. Moreover, for a pattern having a circumferential-direction main groove, there is strong tendency that the slippage between the tread surface and the road surface occurs in a direction perpendicular to a wall portion of the circumferential-direction main groove.

The present invention has the following features. The invention According to the first feature is summarized in that two circumferential-direction main grooves disposed outside quarter point sections of a tread contact width (TW) in a tread width direction, respectively, the two circumferential-direction main grooves extending in a tire circumferential direction, each of the quarter point sections of the tread contact width (TW) being a midpoint between a tire equator line and a corresponding tread end portion, and a plurality of lug grooves extending outwardly from the circumferential-direction main grooves in the tread width direction. Each quarter point section of the tread contact width (TW) has a rib-like shape continuously extending in the tire circumferential direction.

Note that the tread contact width (TW) is defined as a width over which a tread portion is brought into contact with a road surface. The tread contact width (TW) is measured with a tire being mounted on a standard rim, and with the tire being filled at a standard internal pressure (including with the tire being loaded with a standard load). The "standard rim" is a rim specified for each tire under a standard system including a standard on which the tire is based. For example, the "standard rim" means the standard rim under JATMA, the "Design Rim" under TRA, or the "Measuring Rim" under ETRTO. Meanwhile, the above-mentioned "standard internal pressure" is an air pressure specified for each tire under the standards, and is the maximum air pressure under JATMA, the maximum value listed in Table "TIRE LOAD LIMITS AT VARIOUS COLD INFLATION PRESSURES" under TRA, or the "INFLATION PRESSURE" under ETRTO. Moreover, the above-mentioned "standard load" is a load specified for each tire under the above standards, and is the maximum load capacity under JATMA, the maximum value listed in Table "TIRE LOAD LIMITS AT VARIOUS COLD INFLATION PRESSURES" under TRA, or the "LOAD CAPACITY" under ETRTO.

According to such features, since each quarter point section of the tread contact width (TW) has a rib-like shape continuously extending in the tire circumferential direction, no lug grooves are formed in the quarter point section. As a result, this prevents deformation which would otherwise occur in the lug grooves in the quarter point section. In addition, the slippage of a land portion (block) between the lug grooves can be inhibited. For this reason, it is possible to increase the rigidity and volume of the center land portion defined by the circumferential-direction main grooves. Accordingly, it is possible to greatly improve the wear resistance of the quarter point sections of the tread contact width (TW), where the amount of wear is thought to be the largest, and hence to greatly extend the tire lifetime.

The invention According to the other feature is summarized in that a width-direction narrow groove extending in the tread width direction and having a width of 0.5 to 5.0% of the tread contact width (TW) is formed in a center land portion defined by the circumferential-direction main grooves.

The invention According to the other feature is summarized in that a circumferential-direction narrow groove extending in the tire circumferential direction and having a width of 0.5 to 5.0% of the tread contact width (TW) is formed in a center land portion defined by the circumferential-direction main grooves.

The invention According to the other feature is summarized in that a center land portion width (CW) which is a width, in the tread width direction, of the center land portion defined by the circumferential-direction main grooves is not more than 90% of the tread contact width (TW).

The invention According to the other feature is summarized in that the pneumatic tire is a heavy duty tire to be mounted on a construction vehicle.

EFFECTS OF THE INVENTION

The present invention can provide a pneumatic tire capable of providing a greatly extended tire lifetime through great improvement of the wear resistance of the quarter point sections of the tread contact width.

BEST MODES FOR CARRYING OUT THE INVENTION

Next, an example of a pneumatic tire according the present invention is described with reference to the drawings. Note that, in the following description of the drawings, the same or similar reference signs denote the same or similar elements and portions. In addition, it should be noted that the drawings are schematic and ratios of dimensions and the like are different from actual ones. For this reason, specific dimensions and the like should be determined in consideration of the following description. Moreover, the drawings also include portions having different dimensional relationships and ratios from each other.

(Structure of Pneumatic Tire)

Figure 1:
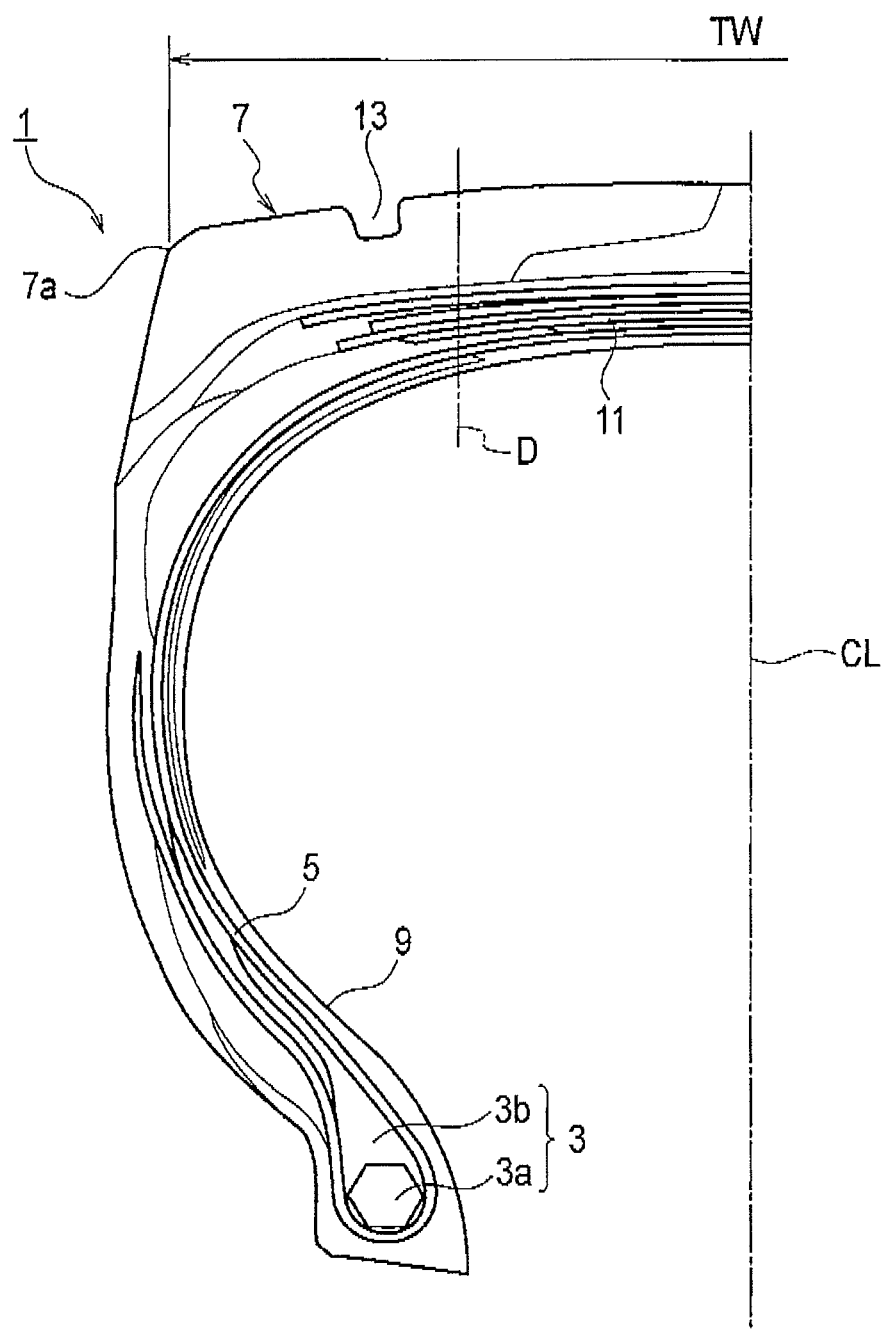
FIG. 1 is a cross-sectional view showing a pneumatic tire according to this embodiment, which is taken in a tread width direction.

First, a structure of a pneumatic tire according to this embodiment is described with reference to FIG. 1. FIG. 1 is a cross-sectional view showing the pneumatic tire according to this embodiment, which is taken in a tread width direction. Note that the pneumatic tire according to this embodiment is assumed to be a heavy duty tire to be mounted on a Construction vehicle.

As shown in FIG. 1, the pneumatic tire 1 substantially includes: a pair of bead portions 3 each including at least a bead core 3a and a bead filler 3b; a carcass layer 5 which is folded back around the bead cores 3a; and a tread portion 7 on which a tread pattern is formed and which is brought into contact with a road surface. Incidentally, the detail of the tread pattern is described later.

An inner liner 9 is provided inside the carcass layer 5. The inner liner 9 corresponds to a tube, and is a highly hermetic rubber layer. Moreover, multiple belt layers 11 reinforcing the tread portion 7 is provided outside the carcass layer 5, i.e., between the carcass layer 5 and the tread portion 7.

(Structure of Tread Pattern)

Figure 2:
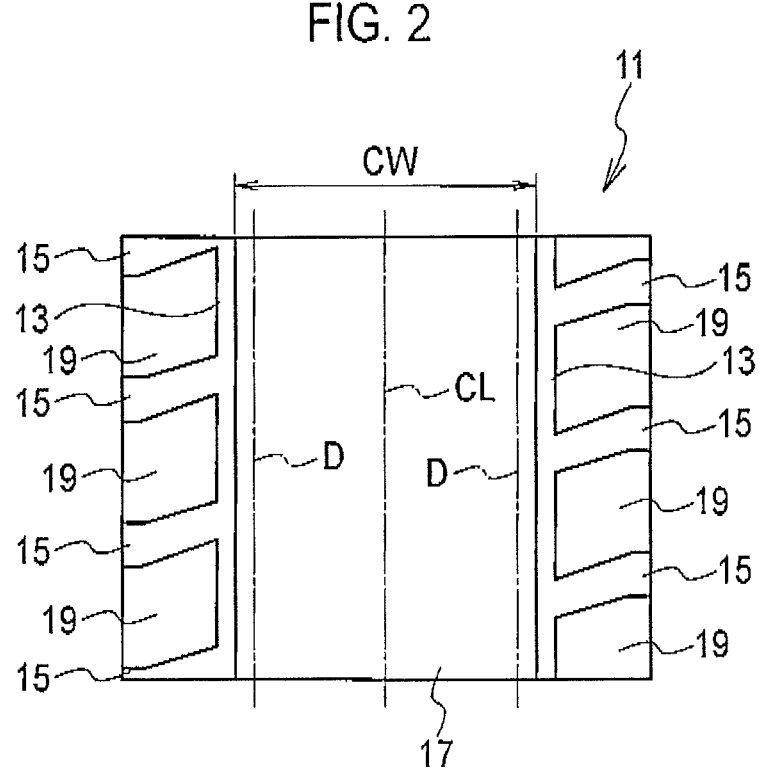
FIG. 2 is a development view showing a tread pattern of the pneumatic tire according to this embodiment.

Next, a structure of a tread pattern formed in the tread portion 7 is described with reference to FIG. 2. FIG. 2 is a development view showing a tread pattern of the pneumatic tire according to this embodiment.

As shown in FIG. 2, two circumferential-direction main grooves 13 and multiple lug grooves 15 are formed in the tread portion 7 (a so-called tread surface). The circumferential-direction main grooves 13 are disposed outside the respective quarter point sections D of the tread contact width TW (refer to FIG. 1) in the tread width direction and extend lineally in a tire circumferential direction. The lug grooves 15 extend outwardly from the circumferential-direction main grooves 13 in the tread width direction. Note that the quarter point sections D of the tread contact width TW represent midpoints each located between a tire equator line CL and corresponding one of tread end portions 7a on both sides.

Each quarter point section of the tread contact width TW has a rib-like shape extending continuously in the tire circumferential direction. Specifically, the quarter point sections of the tread contact width TW exist within a center land portion 17 defined by the circumferential-direction main grooves 13. Accordingly, no circumferential-direction main groove 13 or no lug groove 15 is formed in the quarter point sections of the tread contact width TW point.

Moreover, a center land portion width CW, which is a width in the tread width direction of the center land portion 17 defined by the circumferential-direction main grooves 13, is equal to or less than 90% of the tread contact width TW. Note that a center land portion width CW which is more than 90% of the tread contact width TW may result in reduction in the rigidity of shoulder land portions 19 located outside the center land portion 17 in the tread width direction, causing the shoulder land portions 19 to come off or wear unevenly.

(Operation and Effects)

In the pneumatic tire 1 according to this embodiment described above, since each of the quarter point sections of the tread contact width TW has the rib-like shape extending continuously in the tire circumferential direction, no lug grooves are formed in each quarter point section D. As a result, this prevents deformation which would otherwise occur in the lug grooves in the quarter point section. In addition, the slippage of the land portion (block) between the lug grooves can be inhibited. For this reason, it is possible to increase the rigidity and volume of the center land portion 17 defined by the circumferential-direction main grooves 13. Accordingly, it is possible to greatly improve the wear resistance of the quarter point sections D of the tread contact width TW, where the amount of wear is thought to be largest, and hence to greatly extend the tire lifetime.

Moreover, since the center land portion width CW is equal to or less than 90% of the tread contact width TW, both the rigidity and the volume of the center land portion 17 can be well-achieved simultaneously. Accordingly, it is possible to further improve the wear resistance of the quarter point sections D of the tread contact width TW, where the amount of wear is thought to be largest.

Modification 1

In the description of the pneumatic tire 1 according to the above-described embodiment, only the two circumferential-direction main grooves 13 and the multiple lug grooves 15 are formed in the tread portion 7 (the so-called tread surface). However, the following modification may be made for the embodiment. Note that elements and portions which are the same as or similar to those in the pneumatic tire 1 according to the above-described embodiment are denoted by the same or similar reference signs, and different elements and portions are mainly described.

Figure 3:
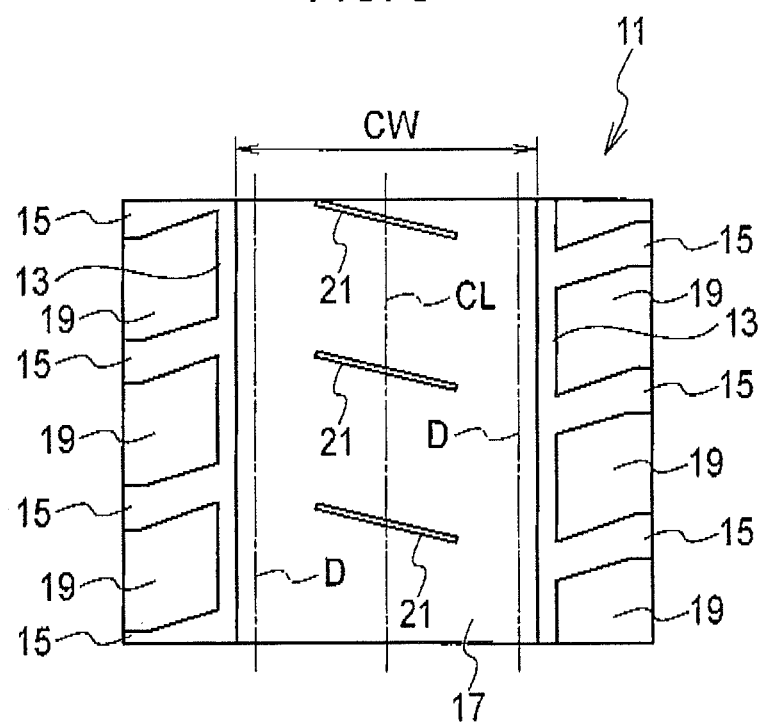
FIG. 3 is a development view showing a tread pattern of a pneumatic tire according to Modification 1.

FIG. 3 is a development view of a tread pattern of a pneumatic tire according to Modification 1. As shown in FIG. 3, multiple width-direction narrow grooves 21 are formed in center land portion 17 defined by the circumferential-direction main grooves 13. Each of the width-direction narrow grooves 21 extends in the tread width direction, and has a width of 0.5 to 5.0% of the tread contact width TW.

Each of the width-direction narrow grooves 21 is provided obliquely with respect to the tread width direction (a tire axis direction). Note that the width-direction narrow grooves 21 are described as that which is provided obliquely with respect to the tread width direction, but are not limited to that. As a matter of course, each of the width-direction narrow grooves 21 may be arranged substantially in parallel with the tread width direction.

In the pneumatic tire 1 according to Modification 1, the width-direction narrow grooves 21 having a width of 0.5 to 5.0% of the tread contact width TW is formed in the center land portion 17. As a result, it is possible to suppress heat generation in the center land portion 17, and hence to further improve the wear resistance of the quarter point section of the tread contact width TW.

Modification 2

In the description of the pneumatic tire 1 according to the above-described embodiment, only the two circumferential-direction main grooves 13 and the multiple lug grooves 15 are formed in the tread portion 7. However, the following modification may be made for the embodiment. Note that elements and portions which are the same as or similar to those in the pneumatic tire 1 according to the above-described embodiment are denoted by the same or similar reference signs, and different elements and portions are mainly described.

Figure 4:
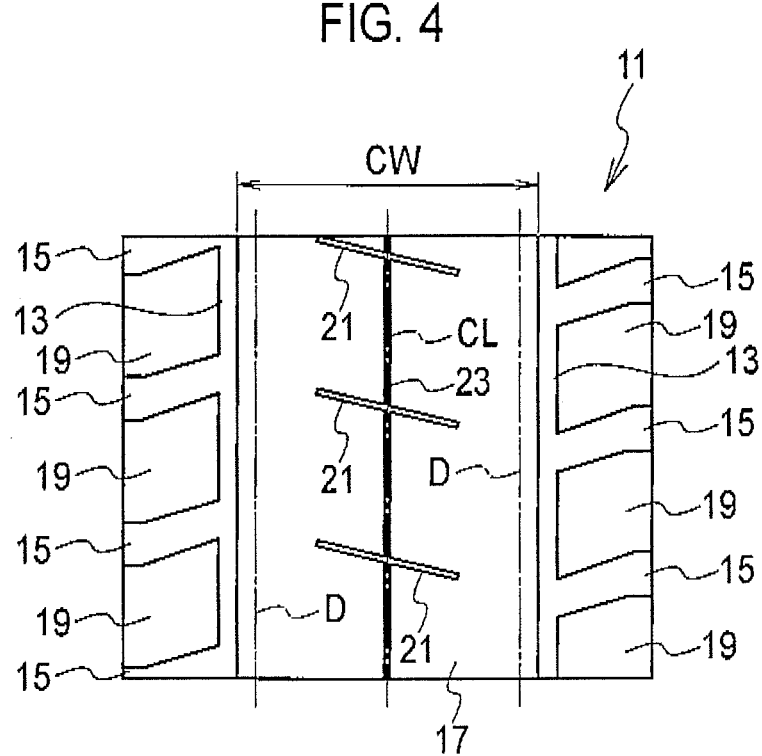
FIG. 4 is a development view showing a tread pattern of a pneumatic tire according to Modification 2.

FIG. 4 is a development view showing a tread pattern of a pneumatic tire according to Modification 2. As shown in FIG. 4, width-direction narrow grooves 21 and a circumferential-direction narrow groove 23 are formed in the center land portion 17 defined by the circumferential-direction main grooves 13. Each of the width-direction narrow grooves 21 extends in the tread width direction, and has a width of 0.5 to 5.0% of the tread contact width TW. The circumferential-direction narrow groove 23 extends in the tire circumferential direction, and has a width of 0.5 to 5.0% of the tread contact width TW.

Each of the width-direction narrow grooves 21 is provided obliquely with respect to the tread width direction (the tire axis direction). Meanwhile, the circumferential-direction narrow groove 23 is provided continuously in the circumferential direction. Note that each of the width-direction narrow grooves 21 is described as that which is provided obliquely with respect to the tread width direction, but is not limited to that. As a matter of course, each of the width-direction narrow grooves 21 may be arranged substantially in parallel with the tread width direction.

In the pneumatic tire 1 according to Modification 2, the width-direction narrow grooves 21 each having a width of 0.5 to 5.0% of the tread contact width TW, and the circumferential-direction narrow groove 23 having a width of 0.5 to 5.0% of the tread contact width TW are formed in the center land portion 17. As a result, it is possible to suppress heat generation in the center land portion 17, and hence to further improve the wear resistance of the quarter point section of the tread contact width TW.

Modification 3

In the description of the pneumatic tire 1 according to the above-described embodiment, only the two circumferential-direction main grooves 13 extending linearly in the tire circumferential direction and the multiple lug grooves 15 are formed in the tread portion 7. However, the following modification may be made for the embodiment. Note that elements and portions which are the same as or similar to those in the pneumatic tire 1 according to the above-described embodiment are denoted by the same or similar reference signs, and different elements and portions are mainly described.

Figure 5:
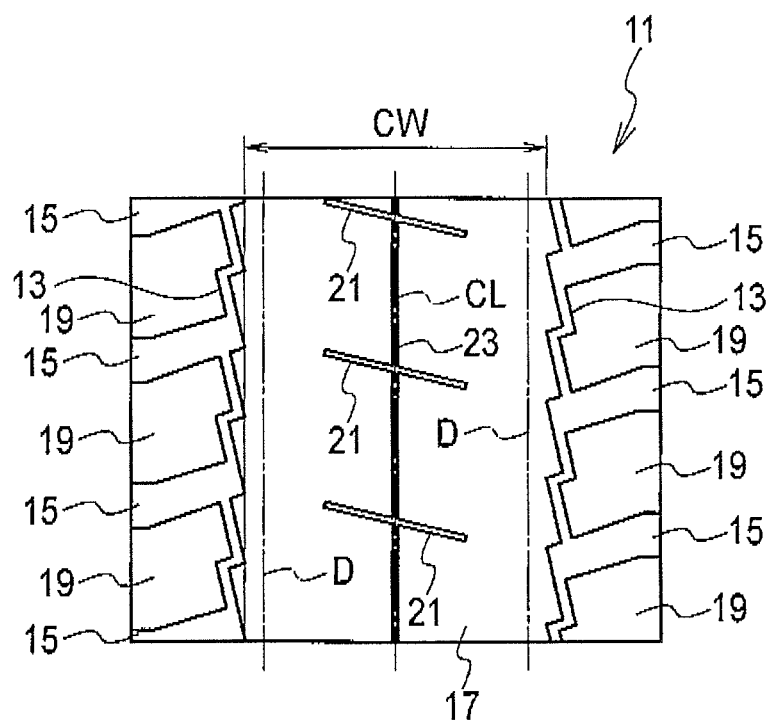
FIG. 5 is a development view showing a tread pattern of a pneumatic tire according to Modification 3.

FIG. 5 is a development view showing a tread pattern of a pneumatic tire according to Modification 3. As shown in FIG. 5, two circumferential-direction main grooves 13 and multiple lug grooves 15 are formed in the tread portion 7. The two circumferential-direction main grooves 13 are disposed outside the respective quarter point sections D of the tread contact width TW (refer to FIG. 1) in the tread width direction, and extend in the tire circumferential direction in a continuous zigzag manner. The lug grooves 15 extend outwardly from the circumferential-direction main grooves 13 in the tread width direction.

Width-direction narrow grooves 21 and a circumferential-direction narrow groove 23 are formed in the center land portion 17 defined by the circumferential-direction main grooves 13. Each of the width-direction narrow grooves 21 extends in the tread width direction, and has a width of 0.5 to 5.0% of the tread contact width TW. The circumferential-direction narrow groove 23 extends in the tire circumferential direction, and has a width of 0.5 to 5.0% of the tread contact width TW.

Each of the width-direction narrow grooves 21 is provided obliquely with respect to the tread width direction (the tire axis direction). Meanwhile, the circumferential-direction narrow groove 23 is provided continuously in the tire circumferential direction. Note that each of the width-direction narrow grooves 21 is described as that which is provided obliquely with respect to the tread width direction, but is not limited to that. As a matter of course, each of the width-direction narrow grooves 21 may be arranged substantially in parallel with the tread width direction.

In the pneumatic tire 1 according to Modification 3, the circumferential-direction main grooves 13 extend in the tire circumferential direction in the continuous zigzag manner. As a result, an operation and effects which are the same as those in Modifications 1 and 2 can be obtained. Moreover, running performances such as traction performance can be improved.

Modification 4

In the description of the pneumatic tire 1 according to the above-described embodiment, only the two circumferential-direction main grooves 13 extending linearly in the tire circumferential direction and the multiple lug grooves 15 are formed in the tread portion 7. However, the following modification may be made for the embodiment. Note that elements and portions which are the same as or similar to those in the pneumatic tire 1 according to the above-described embodiment are denoted by the same or similar reference signs, and different elements and portions are mainly described.

Figure 6:
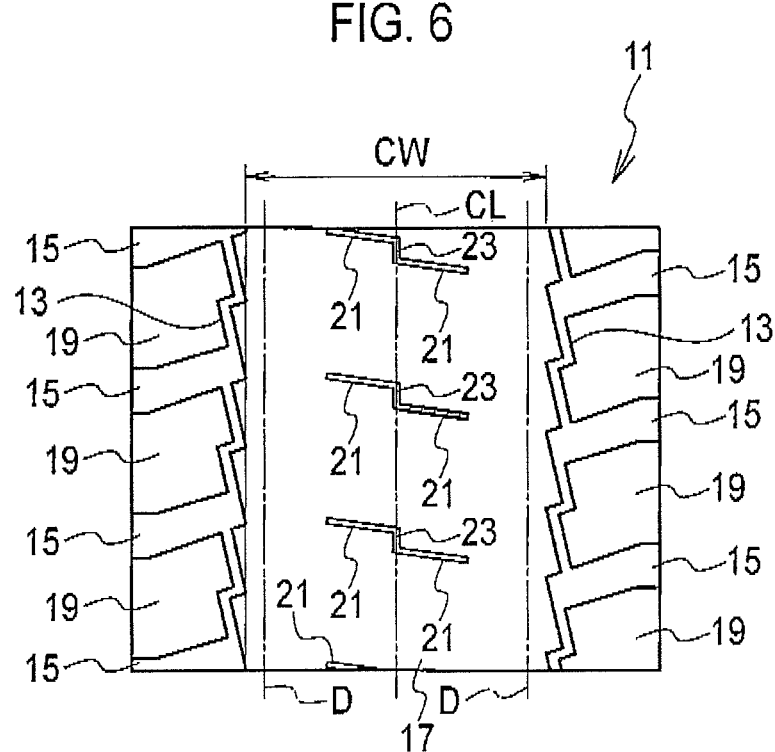
FIG. 6 is a development view showing a tread pattern of a pneumatic tire according to Modification 4.

FIG. 6 is a development view showing a tread pattern of a pneumatic tire according to Modification 4. As shown in FIG. 6, two circumferential-direction main grooves 13 and multiple lug grooves 15 are formed in the tread portion 7. Each of the circumferential-direction main grooves 13 is disposed outside the respective quarter point section D of the tread contact width TW (refer to FIG. 1) in the tread width direction, and extends in the tire circumferential direction in a continuous zigzag manner. The lug grooves 15 extend outwardly from the circumferential-direction main grooves 13 in the tread width direction.

Width-direction narrow grooves 21 and circumferential-direction narrow grooves 23 are formed in the center land portion 17 defined by the circumferential-direction main grooves 13. Each of the width-direction narrow grooves 21 extends in the tread width direction, and has a width of 0.5 to 5.0% of the tread contact width TW. Each of the circumferential-direction narrow grooves 23 extends in the tire circumferential direction, and has a width of 0.5 to 5.0% of the tread contact width TW.

Each of the width-direction narrow grooves 21 is provided obliquely with respect to the tread width direction (the tire axis direction). Meanwhile, the width-direction narrow grooves 21 are provided in such a manner as to be shifted in the tire circumferential direction on the tire equator line CL. Moreover, one circumferential-direction narrow grooves 23 is provided in the interstice between each two neighboring shifted width-direction narrow grooves 21 in such a manner as to connect the width-direction narrow grooves 21 together. Note that each of the width-direction narrow grooves 21 is described as that which is provided obliquely with respect to the tread width direction, but is not limited to that. As a matter of course, each of the width-direction narrow grooves 21 may be arranged substantially in parallel with the tread width direction.

In the pneumatic tire 1 according to Modification 4, each of the circumferential-direction main grooves 13 extends in the tire circumferential direction in the continuous zigzag manner. As a result, an operation and effects which are the same as those in Modifications 1 to 3 can be obtained.

(Comparative Evaluation)

In order to further clarify the effects of the present invention, description is made of results of a test conducted by using pneumatic tires according to Comparative Example and Examples 1 to 3, which are described below. Note that the present invention is not limited to these examples at all.

Figure 7:
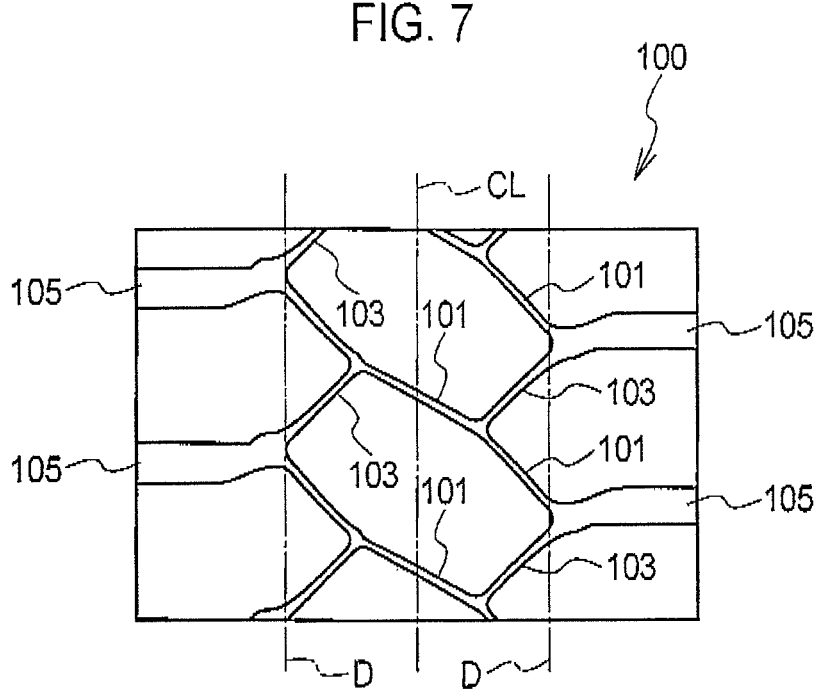
FIG. 7 is a development view showing a tread pattern of a pneumatic tire according to Comparative Example.

Data on each pneumatic tire were measured under the conditions shown below.
 Tire size: 46/90R57
 Rim size: 29.00×6.0
 Internal pressure condition: 700 kPa
 Load condition: 60 tons As shown in FIG. 7, multiple circumferential-direction narrow grooves 101, circumferential-direction narrow grooves 103, and width-direction narrow grooves 105 are formed in a pneumatic tire 100 according to Comparative Example. Each of the circumferential-direction narrow grooves 101 is inclined with respect to the tire circumferential direction. Each of the circumferential-direction narrow grooves 103 is inclined with respect to the tire circumferential direction, but in a direction different from the direction of the circumferential-direction narrow grooves 101. The width-direction narrow grooves 105 extend from the circumferential-direction narrow grooves 101, 103 substantially in parallel with the tread width direction. Note that, in the pneumatic tire 100 according to Comparative Example, the circumferential-direction narrow grooves 101, 103 are formed in quarter point sections of a tread contact width (TW), as shown in FIG. 7. Accordingly, each of the quarter point sections has no rib-like shape extending continuously in the tire circumferential direction.

The pneumatic tire according to Example 1 is that which is shown in FIG. 2. The pneumatic tire according to Example 2 is that which is shown in FIG. 3. The pneumatic tire according to Example 3 is that which is shown in FIG. 4. In other words, in each of the pneumatic tires according to Examples 1 to 3, each of the quarter point sections of the tread contact width TW has a rib-like shape extending continuously in the tire circumferential direction.

Note that Table 1 shows the structures of tread portions of the pneumatic tires according to Comparative Example and Examples 1 to 3. The wear resistances of the pneumatic tires according to Comparative Example and Examples 1 to 3 are described with reference to Table 1.

TABLE 1

|  | CW/TW | Circumferential-direction narrow groove(s) | width-direction narrow grooves | Width of each qroove | Wear resistance |
|---|---|---|---|---|---|
| Comparative Example (FIG. 7) | 35% | ○ | ○ | Tw × 1.2% | 100 |
| Example 1 (FIG. 2) | 65% | X | X | — | 110 |
| Example 2 (FIG. 3) | 65% | X | ○ | TW × 2.0% | 115 |
| Example 3 (FIG. 4) | 65% | ○ | ○ | TW × 1.0% | 115 |

<Wear Resistance>

Pneumatic tires of each type were mounted on steering wheels (front wheels) of a dump truck for construction. The dump truck was driven on an unpaved road until 50% of the center land portion was worn. While a traveling distance of the pneumatic tires according to Comparative Example is indexed at '100,' a traveling distance of pneumatic tires of each of the other types is indexed to the traveling distance of the pneumatic tires according to Comparative Example. Note that a larger index means a longer traveling distance, and accordingly a better wear resistance.

As a result, as shown in Table 1, the pneumatic tires according to each of Examples 1 to 3 achieved a greater traveling distance than the pneumatic tires according to Comparative Example. Accordingly, it was found out that the pneumatic tires according to each of Examples 1 to 3 were excellent in wear resistance. Specifically, it was found out that a pneumatic tire, whose quarter point sections of the tread contact width TW each had a rib-like shape extending continuously in the tire circumferential direction like the pneumatic tires according to Example 1 to 3, was excellent in wear resistance, whereby the tire lifetime was able to be extended.
(Other Embodiments)

As described above, the contents of the present invention have been disclosed by using the embodiment of the present invention. However, it should not be understood that the description and drawings which constitute part of this disclosure limit the present invention.

Specifically, the pneumatic tire 1 has been described as a heavy duty tire to be mounted on a construction vehicle, but is not limited thereto. As a matter of course, the pneumatic tire 1 may be a tire to be mounted on a vehicle other than construction vehicles (such as a bus, a truck, or a passenger automobile).

From this disclosure, various alternative embodiments, examples, and operation techniques will be clear to those skilled in the art. Accordingly, the technical scope of the present invention should be determined only by the matters to define the invention in the scope of claims regarded as appropriate based on the foregoing description.

INDUSTRIAL APPLICABILITY

As described above, the pneumatic tire according to the present invention makes it possible to greatly extend the tire lifetime by greatly improving the wear resistance of the quarter point sections of the tread contact width. Accordingly, the pneumatic tire according to the present invention is useful in terms of a production technique of a tire.

The invention claimed is:

1. A pneumatic tire comprising:
two circumferential-direction main grooves disposed outside quarter point sections of a tread contact width (TW) in a tread width direction, respectively, the two circumferential-direction main grooves extending in a tire circumferential direction, each of the quarter point sections of the tread contact width (TW) being a midpoint between a tire equator line and a corresponding tread end portion;
a plurality of lug grooves extending outwardly from the circumferential-direction main grooves in the tread width direction;
a center land portion defined by the circumferential-direction main grooves includes a width-direction narrow groove which extends in the tread width direction, has a width of 0.5 to 5.0% of the tread contact width (TW), and terminates inside the quarter point section; and
multiple belt layers provided inside of a tread portion, wherein
each quarter point section of the tread contact width (TW) is formed only with a rib-like shape continuously extending in the tire circumferential direction, each quarter point section formed without the lug grooves and the circumferential-direction main grooves;
each quarter point section of the tread contact width (TW) is located, in the tread width direction, outside each end portion of a belt layer located innermost in a radial direction among the multiple belt layers; and wherein
the width-direction narrow groove includes a pair of width-direction narrow grooves, the pair of width-direction narrow grooves are provided in such a manner so as to be shifted in the tire circumferential direction, a circumferential-direction narrow groove is provided in an interstice between the pair of width-direction narrow grooves and terminates inside the pair of width-direction narrow grooves.

2. The pneumatic tire according to claim 1, wherein a circumferential-direction narrow groove extending in the tire circumferential direction and having a width of 0.5 to 5.0% of the tread contact width (TW) is formed in a center land portion defined by the circumferential-direction main grooves.

3. The pneumatic tire according to claim 1, wherein a center land portion width (CW) which is a width, in the tread width direction, of the center land portion defined by the circumferential-direction main grooves is not more than 90% of the tread contact width (TW).

4. The pneumatic tire according to claim 1, wherein the pneumatic tire is a heavy duty tire to be mounted on a construction vehicle.

5. The pneumatic tire according to claim 1, wherein the width-direction narrow groove terminates in the center land portion formed between the circumferential-direction main grooves.

* * * * *